US010595366B2

(12) United States Patent
Frank et al.

(10) Patent No.: US 10,595,366 B2
(45) Date of Patent: Mar. 17, 2020

(54) METHOD FOR OPERATING AN INDUCTION HOB

(71) Applicant: E.G.O. Elektro-Geraetebau GmbH, Oberderdingen (DE)

(72) Inventors: Marcus Frank, Oberderdingen (DE); Marius Lehner, Muehlacker (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 505 days.

(21) Appl. No.: 15/365,284

(22) Filed: Nov. 30, 2016

(65) Prior Publication Data

US 2017/0164427 A1 Jun. 8, 2017

(30) Foreign Application Priority Data

Dec. 2, 2015 (EP) .................................... 15197633

(51) Int. Cl.
*H05B 6/06* (2006.01)
*B23K 13/08* (2006.01)

(52) U.S. Cl.
CPC ....... *H05B 6/062* (2013.01); *H05B 2206/024* (2013.01); *H05B 2213/07* (2013.01)

(58) Field of Classification Search
CPC .............. H05B 6/062; H05B 2206/024; H05B 2213/07
USPC ........ 219/627, 621, 661, 482; 426/231, 510; 99/331
See application file for complete search history.

(56) References Cited

U.S. PATENT DOCUMENTS

| | | | | |
|---|---|---|---|---|
| 8,415,594 B2 | 4/2013 | Schilling et al. | | |
| 9,451,657 B2 | 9/2016 | Schilling et al. | | |
| 9,491,807 B2 | 11/2016 | Schilling et al. | | |
| 2011/0120989 A1 | 5/2011 | Schilling et al. | | |
| 2012/0168425 A1* | 7/2012 | Aldana Arjol ....... | H05B 1/0269 | 219/482 |
| 2013/0087553 A1 | 4/2013 | Schilling et al. | | |
| 2014/0348987 A1 | 11/2014 | Cheng et al. | | |
| 2016/0088685 A1* | 3/2016 | Henke .................... | H05B 6/062 | 219/627 |

(Continued)

FOREIGN PATENT DOCUMENTS

| | | |
|---|---|---|
| CN | 1882201 A | 12/2006 |
| CN | 201001206 Y | 1/2008 |

(Continued)

OTHER PUBLICATIONS

National Intellectual Property Administration, P.R. China, Office Action dated Mar. 5, 2019, for Chinese Patent Application No. 201611096593.1, 21 pages, China.

*Primary Examiner* — Quang T Van
(74) *Attorney, Agent, or Firm* — Alston & Bird LLP

(57) ABSTRACT

In a method for operating an induction hob including a controller and including a cooking point including an induction heating coil, a relationship between a cooking vessel temperature and a heating power of the induction heating coil is stored in the controller as area power which results in a constant cooking vessel temperature during long-term operation. By monitoring whether the cooking vessel temperature remains constant, increases or drops when a first relatively low heating power is set after a heating time at a high heating power, it is possible to set a target temperature, which corresponds to the first relatively low heating power, for frying processes.

19 Claims, 3 Drawing Sheets

(56) References Cited

U.S. PATENT DOCUMENTS

2017/0339751 A1* 11/2017 Meng .................. H05B 1/0266

FOREIGN PATENT DOCUMENTS

| | | | |
|---|---|---|---|
| CN | 101326857 | A | 12/2008 |
| CN | 102711301 | A | 10/2012 |
| CN | 103052193 | A | 4/2013 |
| CN | 103052194 | A | 4/2013 |
| CN | 103369754 | A | 10/2013 |
| JP | 2008-034228 | A | 2/2008 |
| WO | WO 2010/139598 | A1 | 12/2010 |
| WO | WO 2014/173897 | A1 | 10/2014 |
| WO | WO 2014/190160 | A1 | 11/2014 |

* cited by examiner

METHOD FOR OPERATING AN INDUCTION HOB

CROSS-REFERENCE TO RELATED APPLICATIONS

This application claims priority to European Application No. 15197633.9, filed Dec. 2, 2015, the contents of which are hereby incorporated herein in its entirety by reference.

TECHNOLOGICAL FIELD

The invention relates to a method for operating an induction hob, wherein a temperature setting is intended to be implemented or a specific cooking vessel temperature as target temperature is intended to be reached or set and kept constant.

BACKGROUND

The special feature of the method is that no temperature measuring devices which detect the absolute cooking vessel temperature are used. The cooking vessel temperature is determined only indirectly by means of other properties of the cooking vessel, such as a temperature-dependent change in permeability for example. Only a relative change in temperature, but not an absolute temperature, can be detected in this case. The measuring method is known from US 2011/120989 A1.

US 2013/087553 A1 discloses being able to keep a frying temperature, which generally lies somewhat above 200° C., constant. In this case, a target temperature which is reached has to be confirmed as it were.

BRIEF SUMMARY

The invention is based on the problem of providing a method of the kind mentioned in the introductory part, with which method problems of the prior art can be avoided and it is possible, in particular, for a prespecified or input target temperature for a cooking vessel to be able to be, as it were, automatically controlled and maintained in an advantageous manner, preferably in an induction hob.

This problem is solved by a method. Advantageous and preferred refinements of the invention are the subject matter of the further claims and will be explained in greater detail in the text which follows. The wording of the claims is incorporated in the description by express reference.

An induction hob has a controller and a cooking point comprising at least one induction heating coil. A relationship between a cooking vessel temperature and a heating power of the induction heating coil as area power or power density per unit area is advantageously stored in the controller which sets or provides the desired specific cooking vessel temperature in the steady state or stable state or during long-term operation.

It is provided that, in a method for operating this induction hob, a cooking vessel is placed on the cooking point and is inductively heated by the induction heating coil. A target temperature for the cooking vessel or an application which implies a specific target temperature, for example "fry steak", is input into the controller of the induction hob before a heating process of the cooking vessel. The cooking vessel is heated at a first relatively high heating power as area power for a first heating time at the beginning of the heating process, in order to in this way primarily achieve an increase in temperature which is as rapid as possible in order to quickly get close to the target temperature.

The heating power of the induction heating coil is reduced as far as a first relatively low heating power, which would lead to the target temperature in the long term, after the first heating time. This can correspond to the abovementioned relationship between cooking vessel temperature and heating power, if this relationship is stored. This first low heating power is considerably lower than the abovementioned high heating power, and is preferably only approximately 1% to 20% or only up to 10% of the high heating power. A check is then made to determine whether the cooking vessel temperature remains constant, increases or drops at the first relatively low heating power advantageously after a short checking time of from one second to thirty seconds. The method which is used for this purpose will be explained further in the text which follows.

In a first case, the cooking vessel temperature remains constant and corresponds to the target temperature, advantageously at least after the short checking time of a few seconds, when the cooking vessel is heated at the first relatively low heating power for the abovementioned short checking time. The target temperature is deemed to have been achieved in this case and is preferably further maintained, and the actual frying process can then begin for example. In order to maintain the frying temperature, continuous regulation or two-point regulation is advantageously used, as in the prior art. In this case, the temperature can generally be kept approximately constant, under certain circumstances with a slight increase in the heating power owing to the product which is to be fried.

In a further case in which the cooking vessel temperature has not reached the target temperature or even a constant temperature within the short checking time or after the short checking time by the first relatively low heating power being set, the magnitude of the relatively low heating power is adjusted or changed by the controller. In this way, it is possible to attempt to find another heating power which leads to a constant temperature during the short checking time. This other heating power is advantageously also still a relatively low heating power. This can also be used to generally ascertain a temperature value which is currently present, in order to be able to approach the target temperature in a targeted and/or more rapid manner on the basis of the current temperature value.

After the corresponding correlation between heating power and cooking vessel temperature has been found to a sufficiently accurate extent, the controller preferably deems the heating process to be finished, and cooking or frying or simmering is continued. This is advantageously indicated to an operator, and any further method steps can also be initiated.

In a refinement of the invention, the cooking vessel temperature continues to increase after the short checking time in a further case as a second case when the cooking vessel is heated at the first relatively low heating power. Under certain circumstances, there may first be a brief drop in the signal used for determining the temperature, but this does not have a disruptive effect here. The cooking vessel is then once again heated more strongly or further at an intermediate heating power for an intermediate heating time since the cooking vessel temperature still lies below the target temperature, so that the temperature of the cooking vessel once again increases. The intermediate heating power is advantageously greater than the first relatively low heating power, but can also be the same as the first relatively low heating power. Then, after an intermediate heating time, a check is made, by resetting the relatively low heating power, to determine whether the cooking vessel temperature is still increasing or remains constant during a short checking time, under certain circumstances after a short checking time of one second to half a minute or one minute. If the cooking vessel temperature then remains constant, not only is a constant temperature set but the first case, specifically of the target temperature having been reached, applies.

In the case in which the cooking vessel temperature is still increasing after the intermediate heating time and after the short checking time when the cooking vessel is heated at the first relatively low heating power, a cooking vessel temperature which lies below the target temperature can advantageously once again be established. The cooking vessel can then once again be heated more strongly at an intermediate heating power for an intermediate heating time. After the intermediate heating time, a check can once again be made, by setting the relatively low heating power for a short checking time, to determine whether the cooking vessel temperature is still increasing or remains constant after this short checking time, wherein the first case of the target temperature having been reached applies when the cooking vessel temperature remains constant.

In a third case, when the cooking vessel temperature continues to drop even after the checking time elapses when the cooking vessel is heated at the first relatively low heating power, a cooking vessel temperature which lies above the target temperature is established. The target temperature can then be reached in different ways, and this will be explained further in greater detail. In the simplest way, heating is simply continued at the relatively low heating power and the target temperature will be set after some time or a few minutes. As an alternative, the heating operation can be suspended for a short time, for example 5 seconds to 30 seconds or one minute.

Although the essence of the invention includes only the first case and the further case, the second case and even the third case are also advantageously jointly implemented in a control method.

Therefore, the invention, in particular also with the abovementioned optional refinements, can primarily be used to implement the knowledge that, in a method which is applied in practice, a specific heating power as area power leads to a specific final temperature or permanently maintained cooking vessel temperature, specifically largely independently of the kind of cooking vessel used. This applies mainly in the range of between 150° C. and 250° C., primarily 200° C. to 250° C., which is advantageous for frying processes. To this end, care should be taken that the abovementioned relationship between cooking vessel temperature and heating power as area power requires, as it were, the information as to which power is generated by the induction heating coil or plurality of induction heating coils which are interconnected at a cooking point, that is to say which power is introduced into the cooking vessel. Furthermore, the approximate surface area of the cooking vessel or of the cooking vessel base is required, so that the area power can also be determined. However, since cooking points are usually designed for specific sizes of cooking vessel, this also being indicated, in particular, by a marking on the top side of a hob plate, an approximately expected range for the cooking vessel size is known for a defined cooking point. Furthermore, it is also possible, in particular, to ascertain a degree of coverage of the induction heating coil by the cooking vessel by monitoring operating parameters of the induction heating coil, in particular a degree of efficiency of the induction heating coil. When the size of the induction heating coil is known, it is then possible to draw approximate conclusions about the approximate surface area of the cooking vessel or of the cooking vessel base. This is already known to a person skilled in the art in another context. The method assumes that there is no food in the cookware during the heating process and the process of determining the cooking vessel temperature according to the invention. This would distort the above-described setting process for the temperature. However, the distortion would be so significant that the controller can identify this situation and can indicate this to an operator.

The target temperature can be input into the controller by an operator by means of operator control elements. As an alternative, the target temperature can be input by an automatic cooking programme which runs automatically in the controller. What is important is that a target temperature is provided.

The first heating time can be relatively short. In particular, since relatively high target temperatures are intended to be achieved, an attempt is made to select the first relatively high heating power to be very high, advantageously a maximum. For example, the first relatively high heating power can be from 3 $W/cm^2$ to 12 or even 14 $W/cm^2$, in particular from 6 $W/cm^2$ to 10 $W/cm^2$. In this case, this first heating time can lie between one minute and five minutes or even eight minutes. The first heating time can also be prespecified for a specific cooking point or induction heating coil, depending on the size of the cooking point or induction heating coil and therefore an expected cooking vessel size, from empirical values which are stored in a table in the controller, for example two minutes for small induction heating coils, five minutes for medium-sized induction heating coils, and eight minutes for large induction heating coils. These empirical values are based on the fact that, when a cooking vessel, in particular a pan, of corresponding size is placed on a cooking point, this time passes until a temperature of between 200° C. and 250° C. is reached with the first relatively high heating power. As an alternative, the heating time can theoretically also be calculated in the controller by means of thermal capacity of the cookware, power density per unit area and desired temperature increase.

The first relatively low heating power can lie considerably below the first high heating power. In particular, the first relatively low heating power can lie between 0.3 $W/cm^2$ and 2 $W/cm^2$. The first relatively low heating power particularly advantageously lies between 0.6 $W/cm^2$ and 0.8 $W/cm^2$. Within the scope of the invention, it has been found that cooking vessel temperatures of between 200° C. and 250° C. can be maintained in the long term with relatively low heating powers of this kind. It goes without saying that cooking vessel temperatures of this kind could also be achieved merely by setting a relatively low heating power of this kind as area power, but this would then predictably last for a very long time.

The first relatively low heating power is advantageously set or introduced into the cooking vessel for at least one second to 30 seconds or even one minute, that is to say an abovementioned short time as checking time before it is expected that the cooking vessel temperature remains constant. The temperature compensation processes generally last for a few seconds, in particular in the abovementioned first or second case, until the first low heating power defines the introduction of energy. The checking time advantageously lasts for from 5 seconds to 20 seconds.

An abovementioned intermediate heating time can lie in a range similar to the checking time, for example between 5 seconds and 60 seconds, preferably between 10 seconds and 20 seconds. The intermediate heating power should advantageously be higher than the first relatively low heating power, and can also be considerably higher, but does not necessarily have to be. The advantage of selecting a somewhat higher intermediate heating power is that the target temperature can be reached more rapidly when the cooking vessel temperature is obviously still below the target temperature. For example, the intermediate heating power can lie between 1 W/cm$^2$ and 12 W/cm$^2$, in particular between 1.5 W/cm$^2$ and 8 W/cm$^2$, or can be 5% to 100% higher than the first relatively low heating power.

In an advantageous refinement of the invention, it can be provided that, in the third case, the cooking vessel is simply heated at an intermediate heating power, as described above, after the excessively high cooking vessel temperature is established. When the cooking vessel temperature then becomes constant, it corresponds to the target temperature. However, this results in a somewhat slower drop in the cooking vessel temperature, which means that it is only possible to establish the specific cooking vessel temperature as the actual frying temperature at a later time, in particular after several minutes, and therefore the operator can also only start the frying process with a time delay.

As an alternative and more rapidly, heating can be performed at a second intermediate heating power which can then lie somewhat above the first relatively low heating power here, advantageously between 105% and 200% of the first relatively low heating power. The controller waits until this second intermediate heating power leads to a constant cooking vessel temperature. It would then be possible to determine the cooking vessel temperature from the relationship between cooking vessel temperature and heating power, which relationship is stored in the controller. Therefore, the controller can not only identify that the cooking vessel temperature lies above the target temperature but also by how much the cooking vessel temperature lies above the target temperature. In this case, the cooking vessel temperature does not lie at the target temperature but rather above the target temperature, however the controller can again establish the absolute value of the cooking vessel temperature on the basis of the second intermediate heating power given a constant cooking vessel temperature. The heating power can then be reduced once again. Alternatively, the heating power can be switched off for a short time in order to cause the temperature to drop more rapidly to the target temperature. Since the cooking vessel temperature and the target temperature are known, the controller can estimate the time on the basis of stored empirical values. The first relatively low heating power which leads to the target temperature can then be set. As an alternative, the operator can also equally provide the signal for starting the frying process. The cooking vessel can then be cooled relatively rapidly to the target temperature owing to the food being inserted. The controller can then assume the actually desired target temperature for the temperature regulation already described, even if this has not been explicitly set beforehand.

The cooking vessel temperature is checked or a check is made to determine whether the cooking vessel temperature changes or whether it remains constant advantageously by means of a sensor-free method or without a specifically provided temperature sensor. During the heating operation, the oscillation response to at least one induction heating coil is used to detect whether the temperature of the cooking vessel or of the cooking vessel base above the induction heating coil changes or whether the temperature increases. In this way, a temperature gradient of the cooking vessel can be detected by the induction heating coil, this preferably being done in accordance with a method as is described in US 2011/120989 A1. The content of the document is hereby incorporated in the present application by express reference. If this determination of the oscillation response takes place only periodically, it should advantageously be every 0.01 millisecond to one second, advantageously up to 1 millisecond. In general, the oscillation response of an induction heating coil can be understood to mean the evaluation of the change in resonant circuit parameters on the basis of changes in the temperature of the cooking vessel or cooking vessel base, in particular the changing permeability. The oscillation response can preferably be detected at each induction heating coil during operation of a plurality of induction heating coils at the cooking point or for this cooking vessel.

This method advantageously comprises the steps of: generating an intermediate circuit voltage at least temporarily depending on a single-phase or polyphase, in particular three-phase, supply system AC voltage; generating a high-frequency drive voltage or a drive current from the intermediate circuit voltage, for example with a frequency in a range of from 20 kHz to 70 kHz; and applying the drive voltage or the drive current to a resonant circuit comprising the induction heating coil. The cooking vessel is inductively heated in a conventional manner in this way. The following steps are then carried out in order to measure the temperature: generating the intermediate circuit voltage during prespecified time periods, in particular periodically, with a constant voltage level, wherein the intermediate circuit voltage is preferably generated independently of the supply system AC voltage during the time periods; generating the drive voltage during the prespecified time periods in such a way that the resonant circuit oscillates in a substantially deattenuated manner at its inherent resonant frequency; measuring at least one oscillation parameter of the oscillation over the predefined time periods; and evaluating the at least one measured oscillation parameter in order to ascertain the temperature. Since the intermediate circuit voltage is kept constant during the temperature measurement operation, signal influences on account of a variable intermediate circuit voltage can be eliminated, as a result of which the temperature can be ascertained or a change in temperature can be ascertained in a reliable manner and without interference.

In one development, the method comprises the steps of: determining zero crossings of the supply system AC voltage and selecting the time periods in the region of the zero crossings. In the case of a single-phase supply system AC voltage, the intermediate circuit voltage usually drops severely in the region of the zero crossings. The constant voltage level is preferably selected in such a way that it is greater than the voltage level usually established in the region of the zero crossings, so that the intermediate circuit voltage is clamped at the constant voltage level in the region of the zero crossings. Constant voltage conditions, which enable reliable temperature measurement, then prevail in the region of the zero crossings. Therefore, no additional temperature sensors are required here, even if they happen to be present.

In a refinement of the invention, it is possible that there is not only one single induction heating coil, but rather a plurality of induction heating coils, at the cooking point for the cooking vessel. However, a corresponding situation applies here in principle, and the power values are then likewise based on all of the induction heating coils which are present at the cooking point and serve to heat the cooking vessel. The power or area power or heating power of the induction heating coils is then jointly taken into consideration as described above for temperature measurement purposes.

In an advantageous refinement of the invention, it is possible to detect and to monitor the amount of energy introduced or the heating power of the induction heating coil over time. Therefore, estimates can also be made about the temperatures reached. On the basis of the estimates, the controller can vary the heating powers somewhat or else primarily set the first heating time, the checking time, the intermediate heating time or off times. The abovementioned checking times in the various cases can be the same or similar, but do not have to be. The checking times can of course also differ by a factor of 1 to 5.

These and further features can be gathered not only from the claims but also from the description and the drawings, wherein the individual features can be realized in each case on their own or as a plurality in the form of subcombinations in an embodiment of the invention and in other fields, and can constitute embodiments which are advantageous and which are protectable per se and for which protection is claimed here. The subdivision of the application into individual sections and subheadings does not restrict the statements made under them in terms of their general validity.

BRIEF DESCRIPTION OF THE SEVERAL VIEWS OF THE DRAWINGS

Exemplary embodiments of the invention are schematically illustrated in the drawings and will be explained in greater detail in the text which follows. In the drawings.

DETAILED DESCRIPTION

Figure 1:
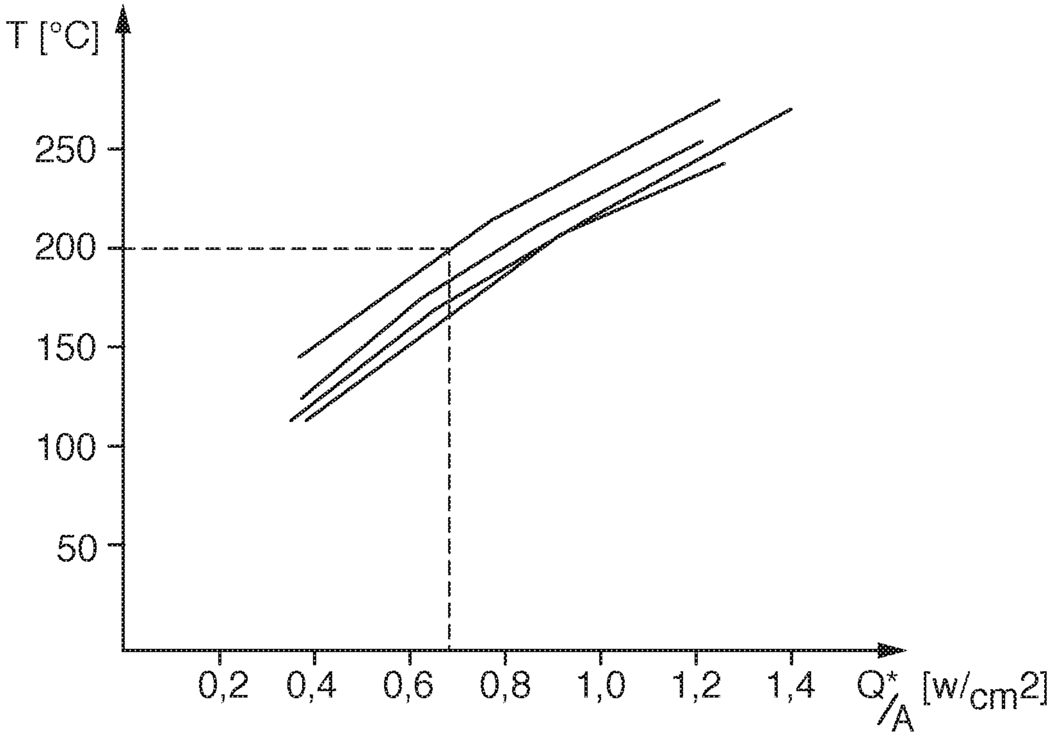
FIG. 1 shows a profile of the cooking vessel temperature, which is kept stable in the long term, as a function of an area power for a plurality of different cooking vessels.

FIG. 1 shows how empirically ascertained values for four different cooking vessels indicate the relationship reflecting how the cooking vessel temperature which is reached or set in the long term depends on the corresponding area power. The figure shows that firstly the relationship is linear to some extent, that is to say can be determined by calculation very easily. Secondly, the temperatures at a specific area power differ from one another by only at most 30° C. to 35° C. Therefore, it is possible to relatively accurately determine which cooking vessel temperature is established at a cooking vessel after a specific relatively long period of operation, for example 10 minutes to 30 minutes, given a specific area power Q*/A.

Figure 2:
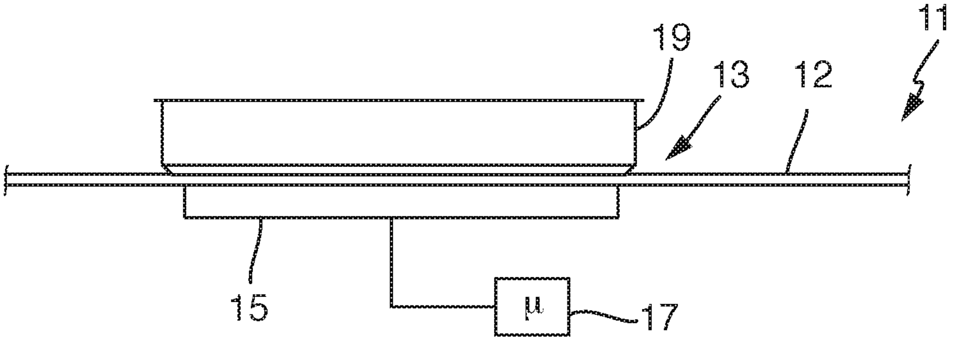
FIG. 2 shows a side view of an induction hob comprising an induction heating coil and a cooking vessel placed on the induction hob.

FIG. 2 shows an induction hob 11 comprising a hob plate 12 in which a cooking point 13 is formed. An induction heating coil 15 is arranged beneath the hob plate 12, the induction heating coil defining and also heating the cooking point 13. The cooking point could also consist of a plurality of induction heating coils, this playing no role in the invention. The induction heating coil 15 is supplied with power and driven by a controller 17, wherein the controller 17 can monitor the power which is fed into the induction heating coil 15. Furthermore, the controller 17 has a memory, not illustrated, in which a relationship between cooking vessel temperature and area power is stored, as it were in accordance with FIG. 1. In this case, it is possible for the calculated relationships to be stored when the temperature curves from FIG. 1 are approximately considered to be straight lines. As an alternative, temperature values for area power which increases in steps in each case can be stored with sufficiently good resolution.

In an advanced refinement of the invention, it is possible for this to be stored in the controller 17 for a plurality of cooking vessels, so that the controller 17, as it were, knows precisely which of the four or even more curves from FIG. 1 is to be used in the respective case. As an alternative, specific parameters could also be input into the controller 17 by an operator or programmed into the controller externally, the specific parameters, independently of the specifically present cooking vessel, informing the controller 17 which cooking vessel is being used or which of the stored curves applies. Under certain circumstances, the controller 17 can then also identify the size range of a cooking vessel which is placed onto the cooking point 13 above it.

It goes without saying that the surface area of the induction heating coil 15 is known. However, the area power is advantageously not based on the surface area of the induction heating coil 15, but rather on the surface area of the cooking vessel 19. In a suitable manner for the cooking point 13, the surface area or the base area of the cooking vessel 19 is moved in a relatively narrow region since suitable cooking vessels usually only have a variation in diameter of up to 3 cm within specific diameter classes. Cooking vessels which are considerably too large or considerably too small are rarely placed on a cooking point, and this could also be identified by the controller 17 and indicated to an operator as an error.

Figure 3:
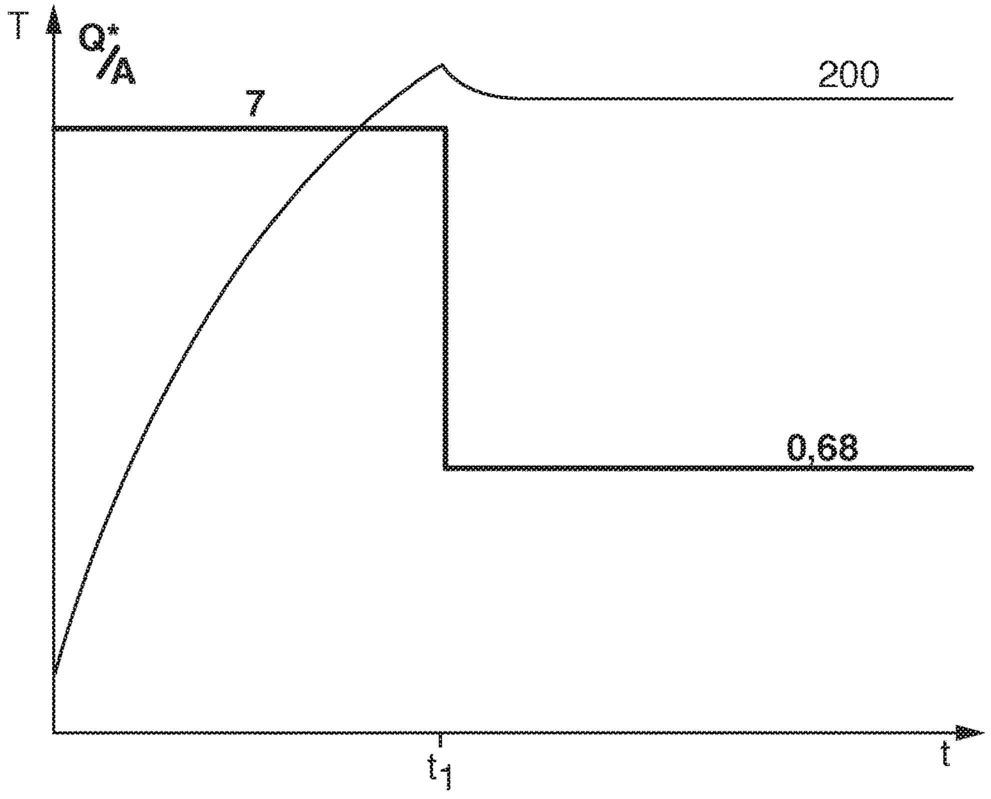
FIGS. 3 to 6 show different profiles of the cooking vessel temperature and the area power over time in various driving situations for empty cooking vessels, that is to say without the addition of a food.

FIG. 3 shows how heating is performed at time t=0 at a high heating power, here 7 W/cm$^2$, which is constant. Heating lasts until time t1 as heating time, which can be predefined.

A target temperature of 200° C. was input by a target person or else by an automatic controller or the like in advance. This temperature should be maintained at the cooking vessel 19, which is a pan in this case, in the long term. This temperature advantageously applies to the top side of the cooking vessel base, that is to say at the point where food, for example a steak which is to be fried, comes into contact with the cooking vessel 19. The topmost curve from FIG. 1 applies for the cooking vessel 19.

After the heating time t1 elapses, the heating power is greatly reduced and set to 0.68 W/cm$^2$. This corresponds to the topmost curve in FIG. 1 and the temperature of 200° C. is permanently maintained at this area power.

FIG. 3 shows, in accordance with the first case, that the temperature T drops only slightly and then relatively rapidly, for example in 5 seconds to 20 or 30 seconds as adjustment time, becomes constant. Both the small temperature drop and also the constant temperature can be identified by an abovementioned method or in accordance with US 2011/120989 A1 or US 2013/087553 A1.

Since the cooking vessel temperature now remains permanently constant at the area power of 0.68 W/cm$^2$, this is fixed at 200° C. in accordance with FIG. 1 and can therefore be permanently maintained.

Figure 4:
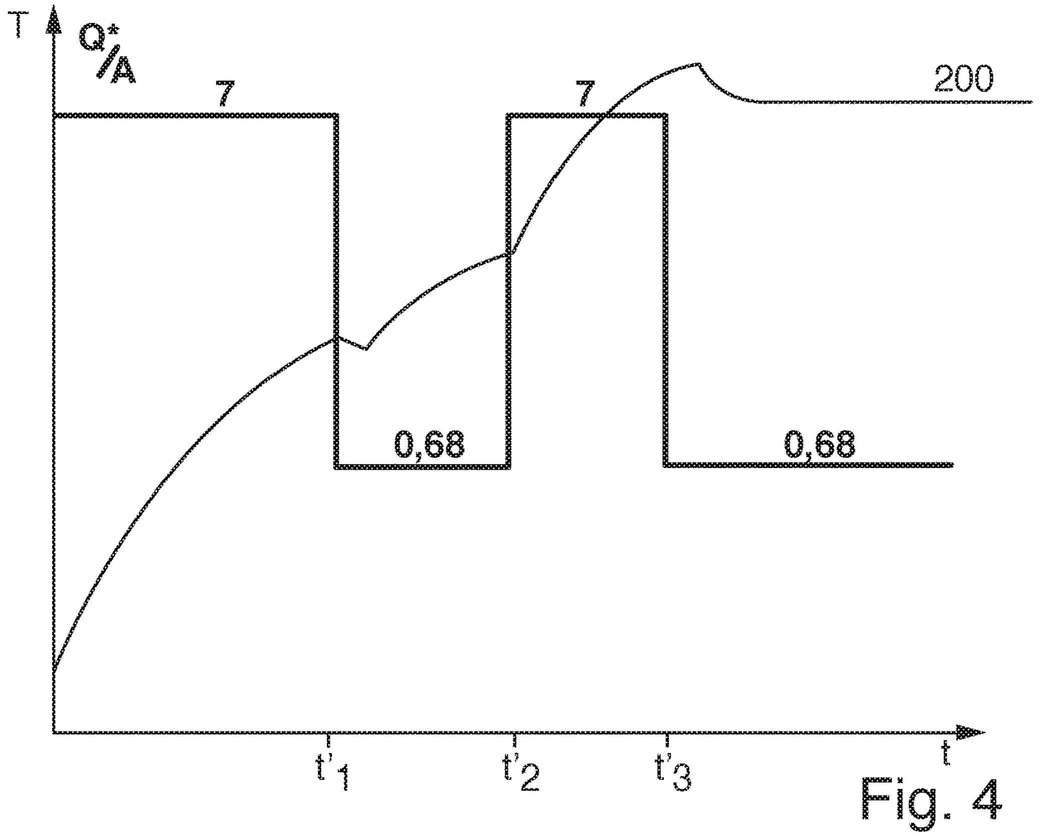

In the next case in accordance with FIG. 4, heating is performed up to time t1' as heating time at a higher area power of 7 W/cm$^2$, wherein the temperature T increases again. At time t1', the power is reduced to 0.68 W/cm$^2$ in accordance with a target temperature of 200° C. which is also desired here. The controller 17 or the temperature detection means can now establish that the cooking vessel temperature continues to increase, albeit probably more weakly than before, at this area power which is now set. This therefore means that the cooking vessel temperature at time t2' still lies below the target temperature of 200° C. The time between t1' and t2' is the abovementioned checking time. Therefore, a considerably higher power, and in particular the previously set high power, of 7 W/cm$^2$ is again set at time t2' which follows, for example, a few seconds to one or two minutes after time t1'. The temperature T then increases strongly again. After a certain time as intermediate heating time between t2' and t3', for example a few seconds to one minute to three minutes, the power is again reduced to the power in accordance with the target temperature, that is to say to the first low heating power of 0.68 W/cm$^2$ again. The temperature detection means now identifies that the cooking vessel temperature T first decreases to a certain extent and then, however, relatively rapidly, for example within one minute or even only a few seconds as adjustment time, exhibits only a small drop or becomes constant. Therefore, it is again the case that a constant cooking vessel temperature is reached at an area power of 0.68 W/cm$^2$. This then has to be the target temperature 200° C. according to FIG. 1 or as described above in relation to FIG. 3. Renewed subsequent heating at the higher heating power was required in this case since the cooking vessel requires more energy than assumed by the controller in order to reach the specific temperature. The thermal capacity of the cooking vessel therefore differed from the value stored in the controller.

The second time or intermediate heating time at a high heating power in FIG. 4 between t2' and t3' could also have a different area power than the heating time up to time t1' However, the heating processes should proceed relatively rapidly here, and therefore an at least high area power close to the maximum area power should be selected.

Figure 5:
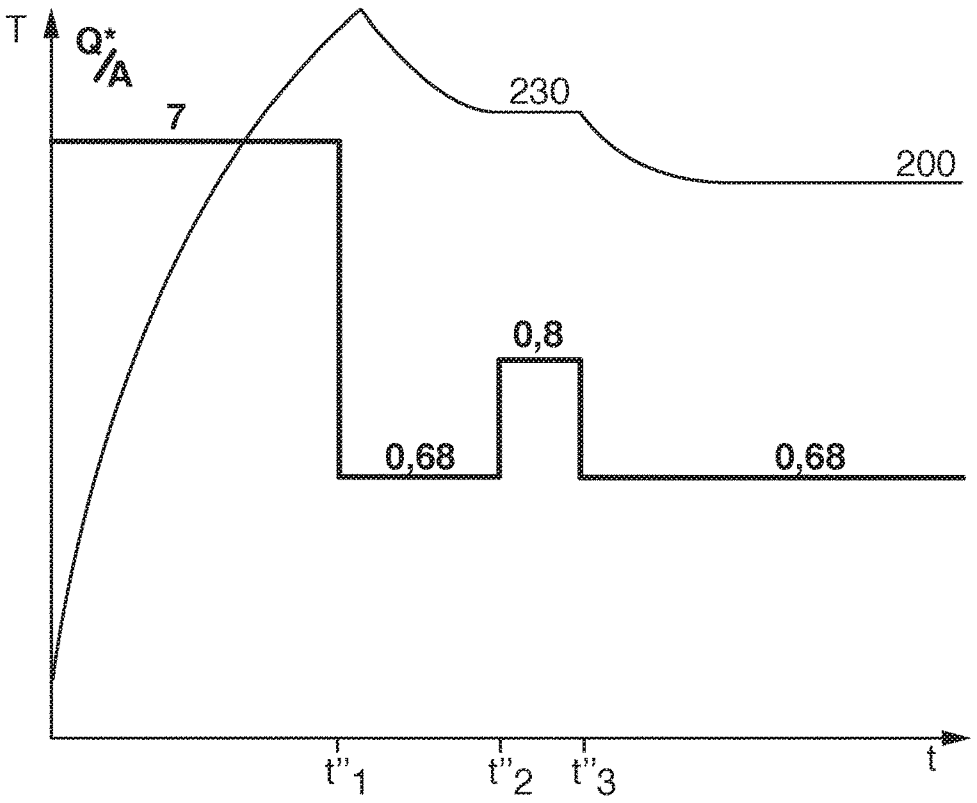

The situation of overheating during the heating time is shown in FIG. 5. Here, heating is also performed at the high power of 7 W/cm$^2$ at a desired target temperature of 200° C. for the heating time up to a time t1", whereupon the temperature T increases. Then, starting from time t1", heating is performed at the low area power of 0.68 W/cm$^2$ for a checking time, that is to say for a few seconds to half a minute, in order to see whether the cooking vessel temperature becomes constant relatively rapidly here, which would be evaluated as the target temperature having been reached. However, the controller 17 establishes by means of the abovementioned temperature monitoring that the cooking vessel temperature also permanently falls after the checking time expires, even after one or two minutes as adjustment time. This means that a cooking vessel temperature considerably above the target temperature therefore prevails. The power can now be entirely switched off for a short time, for example 10 seconds to 30 seconds, in order to rapidly cool the cooking vessel down to the target temperature or close to the target temperature. Operation could then restart at the low heating power of 0.68 W/cm$^2$ and, as shown by experience, the temperature would then become constant relatively rapidly and then even amount to the target temperature of 200° C.

Alternatively, according to another possibility, an attempt is made to approximately determine the prevailing temperature. Therefore, a somewhat higher heating power than the intermediate heating power, specifically 0.8 W/cm$^2$ here, is fed into the induction heating coil 15 for the intermediate heating time between t2" and t3". In the process, a constant temperature, which lies at approximately 230° C. according to FIG. 1, is established relatively rapidly. Therefore, the controller 17 knows that the temperature is still approximately 30° C. too high. The controller can then again, as described above, completely switch off the induction heating coil 15 for a short time, for example for 10 seconds to 30 seconds, for the purpose of somewhat more rapid cooling, wherein the low heating power is then set again for the purpose of reaching and maintaining the target temperature. As an alternative, the area power of 0.68 W/cm$^2$, which corresponds to the target temperature, can be set starting from time t3", so that the cooking vessel temperature T drops to the target temperature somewhat more slowly, but which target temperature is then ultimately reached and maintained. Relatively rapid cooling can also be achieved by inserting the food which is to be cooked. The measurement value which corresponds to 200° C., and not the measurement value which corresponds to 230° C., is then advantageously used as the setpoint value for temperature regulation which follows the addition of food.

Figure 6:
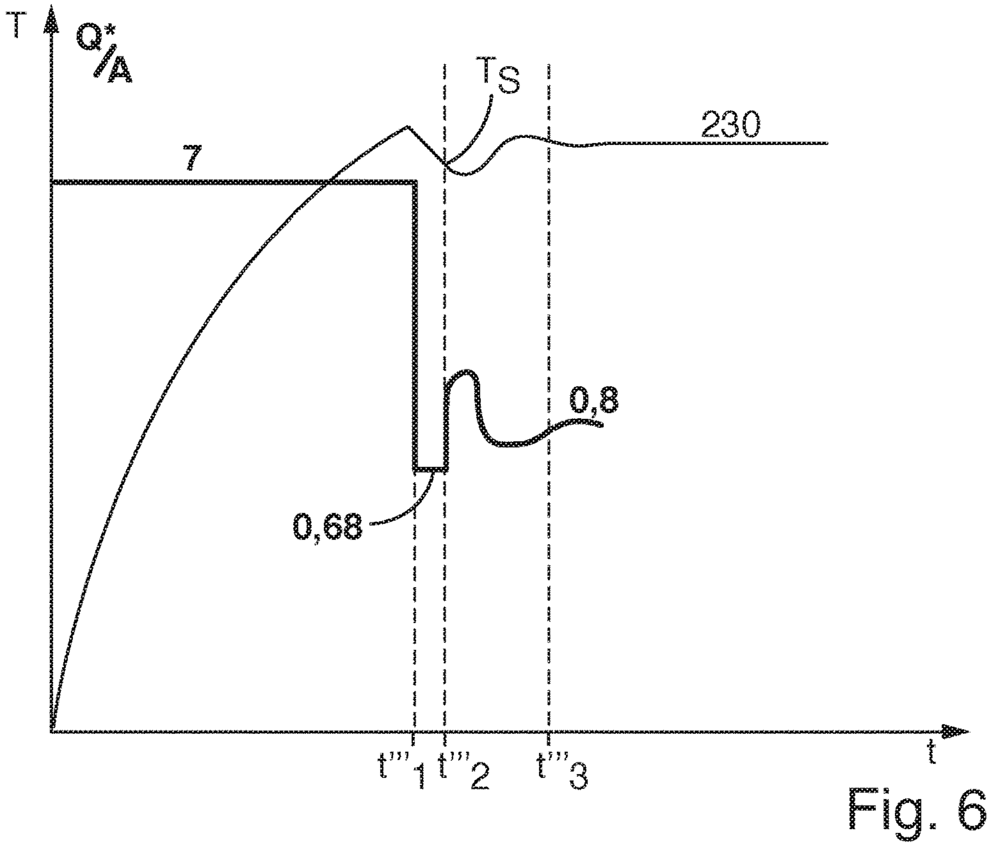

FIG. 6 shows a further advantageous refinement of the method for reaching a specific cooking vessel temperature in a defined manner. If the constant steady-state temperature is not reached after a short period of time, irrespective of whether the signal is falling or increasing, no discrete power stages are subsequently approached between t2'" and t3'". Rather, a setpoint value $T_S$ of the temperature signal is ascertained after a fixed time, here at t2'" at 230° C. The controller then adjusts the temperature signal to this setpoint value $T_S$, for example using a proportional controller which can also have integral or differential components. Therefore, a constant temperature is reached relatively rapidly at t3'", more rapidly than would be possible with discrete temperature stages. According to FIG. 1, an area power of 0.8 W/cm$^2$ corresponds to a cooking vessel temperature of 230° C. Therefore, the cooking vessel temperature of 230° C. is maintained at this area power density. In this way, the corresponding correlation of power and constant temperature is found again, wherein the power which allows the temperature to be determined and therefore the temperature to be set is known. The specific cooking vessel temperature of 200° C. can now be approached on the basis of known relationships by power reduction starting from the known temperature, for example with the product to be cooked being inserted at the same time.

Therefore, the temperature can be controlled and a specific temperature can be approached and maintained on a cooking vessel by way of the invention, without absolute temperature measurement and merely by relative temperature measurement, that is to say monitoring whether a temperature is increasing, dropping or is constant, and a known relationship between temperature and permanently set area power density.

Furthermore, the invention makes use of the fact that, in a steady-state, that is to say a permanently prevailing state, a thermal resistance is connected in series with a parallel circuit as radiant heat resistance and convection heat resistance. The relationship which can be identified in FIG. 1 is the result.

Therefore, the invention makes use of an energy balance in order to solve the problem presented at the outset. By seeking a steady state, that is to say a state without a change in the cooking vessel temperature, the inherent energy of the cooking vessel is kept constant. As a result, it is known that the energy which is introduced into the cooking vessel by the heater is entirely output again, be it by convection, thermal radiation or thermal conduction to the hob surface. However, the introduced energy can be measured by the heater. Since the relationship is known from FIG. 1, conclusions can be drawn about the absolute temperature by means of measurement of energy per unit time or power, given certain boundary conditions.

That which is claimed:

1. A method for operating an induction hob for reaching a specific cooking vessel temperature in a defined manner, wherein said induction hob comprises a controller and a cooking point comprising at least one induction heating coil, said method comprising the steps of:

inductively heating, by said induction heating coil, a cooking vessel being placed on said cooking point;

providing a target temperature for said cooking vessel or an application which implies a specific target temperature being input into said controller of said induction hob before a heating process of said cooking vessel;

heating said cooking vessel at a first relatively high heating power as area power for a first heating time at the beginning of the heating process;

reducing a heating power of said induction heating coil as far as a first relatively low heating power, which would lead to said target temperature after a period of operation of 10 minutes to 30 minutes, after said first heating time; and performing a check to determine whether a temperature of said cooking vessel remains constant, increases or drops at said first relatively low heating power after a short checking time, wherein in a first case, in which said cooking vessel temperature remains constant and corresponds to said target temperature after said short checking time in an instance in which said cooking vessel is heated at said first relatively low heating power, said target temperature is deemed to have been achieved, and wherein in a further case, in which said cooking vessel temperature has not reached said target temperature after said short checking time by the said first relatively low heating power being set, a magnitude of said first relatively low heating power is enlarged by said controller in order to find a heating power which leads to a constant temperature during said short checking time.

2. The method according to claim 1, wherein, after a corresponding correlation of heating power and cooking vessel temperature has been found to a sufficiently accurate extent, said controller deems said heating process to be finished and indicates this to an operator or initiates further method steps.

3. The method according to claim 1, wherein:

in a further case as a second case, in an instance in which said cooking vessel is heated at said first relatively low heating power, said cooking vessel temperature continues to increase after said short checking time, a cooking vessel temperature which lies below said target temperature is established and said cooking vessel is once again heated more strongly at an intermediate heating power for an intermediate heating time, and then, after said intermediate heating time, a check is once again made, by setting said relatively low heating power, to determine whether said cooking vessel temperature is still increasing or remains constant after a short checking time; and said first case of said target temperature having been reached applies in an instance in which said cooking vessel temperature remains the same.

4. The method according to claim 1, said target temperature lies between 200° C. and 250° C.

5. The method according to claim 3, wherein:

in the case in which said cooking vessel temperature is still increasing after said intermediate heating time and after said short checking time, a cooking vessel temperature which lies below said target temperature is once again established and said cooking vessel is once again heated more strongly at an intermediate heating power for an intermediate heating time, and then, after said intermediate heating time, a check is once again made, by setting said relatively low heating power for a short checking time, to determine whether said cooking vessel temperature is still increasing or remains constant after said short checking time; and said first case of the target temperature having been reached applies in an instance in which said cooking vessel temperature remains constant.

6. The method according to claim 1, wherein in a further case as a third case, in an instance in which said cooking vessel is heated at said first relatively low heating power, said cooking vessel temperature drops after said short checking time and a cooking vessel temperature which lies above said target temperature is established.

7. The method according to claim 6, wherein:

in said third case said cooking vessel is heated at an intermediate heating power of between 105% and 200% of said first relatively low heating power and a cooking temperature which is set at a constant value after said short checking time is checked and said cooking vessel temperature is determined from said check from a relationship, which is known in said controller, between cooking vessel temperature and heating power as area power; and on a basis of this, a heating power is again reduced to a heating power which would lead to said target temperature after a period of operation of 10 minutes to 30 minutes.

8. The method according to claim 7, wherein said intermediate heating power is greater than said first relatively low heating power.

9. The method according to claim 8, wherein said intermediate heating power is 10% to 100% greater than said first relatively low heating power.

10. The method according to claim 1, wherein said short checking time lasts from 1 second to 30 seconds.

11. The method according to claim 10, wherein said short checking time lasts from 5 seconds to 20 seconds.

12. The method according to claim 1, wherein said intermediate heating time lasts from 5 seconds to 60 seconds.

13. The method according to claim 1, wherein a heating power is reduced to a low heating power which corresponds to said target temperature and a check is made in an instance in which said cooking vessel temperature is constant and therefore corresponds to said target temperature.

14. The method according to claim 1, wherein:

said cooking vessel is operated at a cooking point comprising one or more induction heating coils; and a power of said induction heating coils is taken into consideration jointly as area power or heating power.

15. The method according to claim 1, wherein a quantity of introduced energy or said heating power of said induction heating coil is monitored over time.

16. The method according to claim 1, wherein said first relatively high heating power is from 3 $W/cm^2$ to 12 $W/cm^2$.

17. The method according to claim 1, wherein said first relatively low heating power is from 0.3 $W/cm^2$ to 2 $W/cm^2$.

18. The method according to claim 1, wherein said intermediate heating power is from 1 $W/cm^2$ to 12 $W/cm^2$.

19. The method according to claim 1, wherein a cooking vessel size is ascertained by taking into account a degree of efficiency of said induction heating device due to coverage of said induction heating coil by said cooking vessel which has been placed on one of said cooking points.

* * * * *